(12) United States Patent
Miles et al.

(10) Patent No.: US 12,519,809 B2
(45) Date of Patent: Jan. 6, 2026

(54) SCALABLE ASSESSMENT AND PRIORITIZATION OF NETWORK ASSET CRYPTOGRAPHY FOR QUANTUM RISK MITIGATION

(71) Applicant: AT&T Intellectual Property I, L.P., Atlanta, GA (US)

(72) Inventors: Brian M. Miles, Pittsboro, IN (US); Elizabeth Wood, Atlanta, GA (US); Anthony Ramos, Gainesville, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 135 days.

(21) Appl. No.: 18/505,091

(22) Filed: Nov. 8, 2023

(65) Prior Publication Data
US 2025/0150466 A1    May 8, 2025

(51) Int. Cl.
*H04L 9/40* (2022.01)
(52) U.S. Cl.
CPC ............... *H04L 63/1416* (2013.01)
(58) Field of Classification Search
None
See application file for complete search history.

(56) References Cited

U.S. PATENT DOCUMENTS

| | | | | |
|---|---|---|---|---|
| 10,243,976 | B2* | 3/2019 | Greeter | H04L 63/1425 |
| 10,339,147 | B1* | 7/2019 | Barmes | G06N 5/046 |
| 11,218,471 | B1* | 1/2022 | Stapleton | H04L 9/0668 |
| 11,503,061 | B1* | 11/2022 | Lin | H04L 63/102 |
| 11,784,998 | B1* | 10/2023 | Stapleton | H04L 63/1416 |
| 2015/0244732 | A1* | 8/2015 | Golshan | H04L 63/145 726/24 |
| 2019/0236661 | A1* | 8/2019 | Hogg | G06F 16/9537 |
| 2020/0167705 | A1* | 5/2020 | Risoldi | G06F 21/554 |
| 2020/0252422 | A1* | 8/2020 | Davis | H04L 63/102 |
| 2021/0216928 | A1* | 7/2021 | O'Toole | G06F 16/29 |
| 2022/0272115 | A1* | 8/2022 | McParland | G06N 5/04 |
| 2023/0156031 | A1* | 5/2023 | Subramanian | H04L 63/14 726/25 |
| 2025/0150466 | A1* | 5/2025 | Miles | H04L 63/1433 |

* cited by examiner

*Primary Examiner* — Backhean Tiv (57) ABSTRACT

A method includes identifying a plurality of assets of an enterprise for which quantum risk is to be assessed, acquiring a plurality of sets of metadata, where each set of metadata describes one asset of the plurality of assets, executing a machine learning model that takes the plurality of sets of metadata as input and generates as output a plurality of scores, where each score of the plurality of scores quantifies a quantum risk associated with one set of metadata of the plurality of sets of metadata that corresponds to one asset of the plurality of assets, and initiating a remedial action for a first asset of the plurality of assets, based on a first score of the plurality of scores that is assigned to a first set of metadata of the plurality of sets of metadata corresponding to the first asset at least meeting a predefined threshold.

20 Claims, 4 Drawing Sheets

| FIELD NAME | DESCRIPTION | WEIGHT |
|---|---|---|
| Field_name_1 | Critical to enterprise's mission | A |
| Field_name_2 | Customer facing | B |
| Field_name_3 | Sensitive personal information | C |
| Field_name_4 | Payment card industry | D |
| Field_name_5 | Internet facing | E |
| Field_name_6 | Customer proprietary information network | F |
| Field_name_7 | Customer privacy | G |
| Field_name_8 | Active status | H |
| Field_name_9 | Customer account authentication data | I |
| Field_name_10 | Restricted personal information | J |
| Field_name_11 | Sensitive customer data | K |
| Field_name_12 | Governed by SOX regulations or FSAs | L |
| Field_name_13 | User interface type | M |

SCALABLE ASSESSMENT AND PRIORITIZATION OF NETWORK ASSET CRYPTOGRAPHY FOR QUANTUM RISK MITIGATION

The present disclosure relates generally to cybersecurity, and relates more particularly to devices, non-transitory computer-readable media, and methods for the assessment and prioritization of network asset cryptography for quantum risk mitigation.

BACKGROUND

A quantum computer is a computer that uses quantum bits ("qubits"), which behave and interact according to the laws of quantum mechanics, in place of the conventional bits used by classical computers. In principle, a quantum computer can perform certain mathematical algorithms exponentially faster than a classical computer. A cryptographically relevant quantum computer (CRQC) is a quantum computer that is capable of attacking real world cryptographic systems that would be infeasible to attack with a classical computer. For instance, in principle, a CRQC can crack a 2048-bit Rivest-Shamir-Adleman (RSA) number using Shor's Algorithm.

SUMMARY

In one example, the present disclosure describes a device, computer-readable medium, and method for the assessment and prioritization of network asset cryptography for quantum risk mitigation. For instance, in one example, a method for guarding network assets against quantum risk includes identifying a plurality of assets of an enterprise for which quantum risk is to be assessed, acquiring a plurality of sets of metadata, where each set of metadata of the plurality of sets of metadata describes one asset of the plurality of assets, executing a machine learning model that takes the plurality of sets of metadata as input and generates as output a plurality of scores, where each score of the plurality of scores quantifies a quantum risk associated with one set of metadata of the plurality of sets of metadata that corresponds to one asset of the plurality of assets, and initiating a remedial action for a first asset of the plurality of assets, based on a first score of the plurality of scores that is assigned to a first set of metadata of the plurality of sets of metadata corresponding to the first asset at least meeting a predefined threshold.

In another example, a non-transitory computer-readable medium stores instructions which, when executed by the processing system including at least one processor, cause the processing system to perform operations. The operations include identifying a plurality of assets an enterprise for which quantum risk is to be assessed, acquiring a plurality of sets of metadata, where each set of metadata of the plurality of sets of metadata describes one asset of the plurality of assets, executing a machine learning model that takes the plurality of sets of metadata as input and generates as output a plurality of scores, where each score of the plurality of scores quantifies a quantum risk associated with one set of metadata of the plurality of sets of metadata that corresponds to one asset of the plurality of assets, and initiating a remedial action for a first asset of the plurality of assets, based on a first score of the plurality of scores that is assigned to a first set of metadata of the plurality of sets of metadata corresponding to the first asset at least meeting a predefined threshold.

In another example, a system includes a processing system including at least one processor and a non-transitory computer-readable medium storing instructions which, when executed by the processing system, cause the processing system to perform operations. The operations include identifying a plurality of assets of an enterprise for which quantum risk is to be assessed, acquiring a plurality of sets of metadata, where each set of metadata of the plurality of sets of metadata describes one asset of the plurality of assets, executing a machine learning model that takes the plurality of sets of metadata as input and generates as output a plurality of scores, where each score of the plurality of scores quantifies a quantum risk associated with one set of metadata of the plurality of sets of metadata that corresponds to one asset of the plurality of assets, and initiating a remedial action for a first asset of the plurality of assets, based on a first score of the plurality of scores that is assigned to a first set of metadata of the plurality of sets of metadata corresponding to the first asset at least meeting a predefined threshold.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for the assessment and prioritization of network asset cryptography for quantum risk mitigation. As discussed above, a cryptographically relevant quantum computer (CRQC) is a quantum computer that is capable of attacking real world cryptographic systems that would be infeasible to attack with a normal computer. For instance, in principle, a CRQC can crack a 2048-bit RSA number using Shor's Algorithm. Once such a CRQC is achieved, public key cryptosystems will be at greatly increased risk of cyberattack. For instance, an attack launched by a CRQC has the potential to severely impact ecommerce, virtual private network (VPN) connections, the privacy of encrypted medical, financial, and other sensitive information, and more.

Moreover, although the timing is uncertain, CRQCs will inevitably become the future of computing. As such, it is crucial to begin implementing crypto-agile architecture as soon as possible. However, for large-scale communications service providers, it may be challenging to identify the applications and network/database/information technology infrastructure elements that are both most at risk and most important to protect (and that should, therefore, be prioritized for protective measures). For instance, software applications that are Internet facing, classified as mission critical, and contain sensitive personal information or other sensitive data would be associated with a much greater quantum risk than applications that are not Internet facing, not classified as mission critical, and do not contain sensitive data.

Examples of the present disclosure utilize machine learning techniques to examine a set of input metadata associated with a network asset such as a software application and to generate, based on the set of input metadata, a score that indicates the quantum risk associated with (i.e., expected impact of a CRQC on) the network asset. Once scores have been generated for a plurality of network assets, the scores can be used to rank the network assets according to quantum risk, allowing a network operator to easily and efficiently identify the network assets that should be prioritized for protective measures. These and other aspects of the present disclosure are discussed in further detail with reference to FIGS. 1-4, below.

Figure 1:
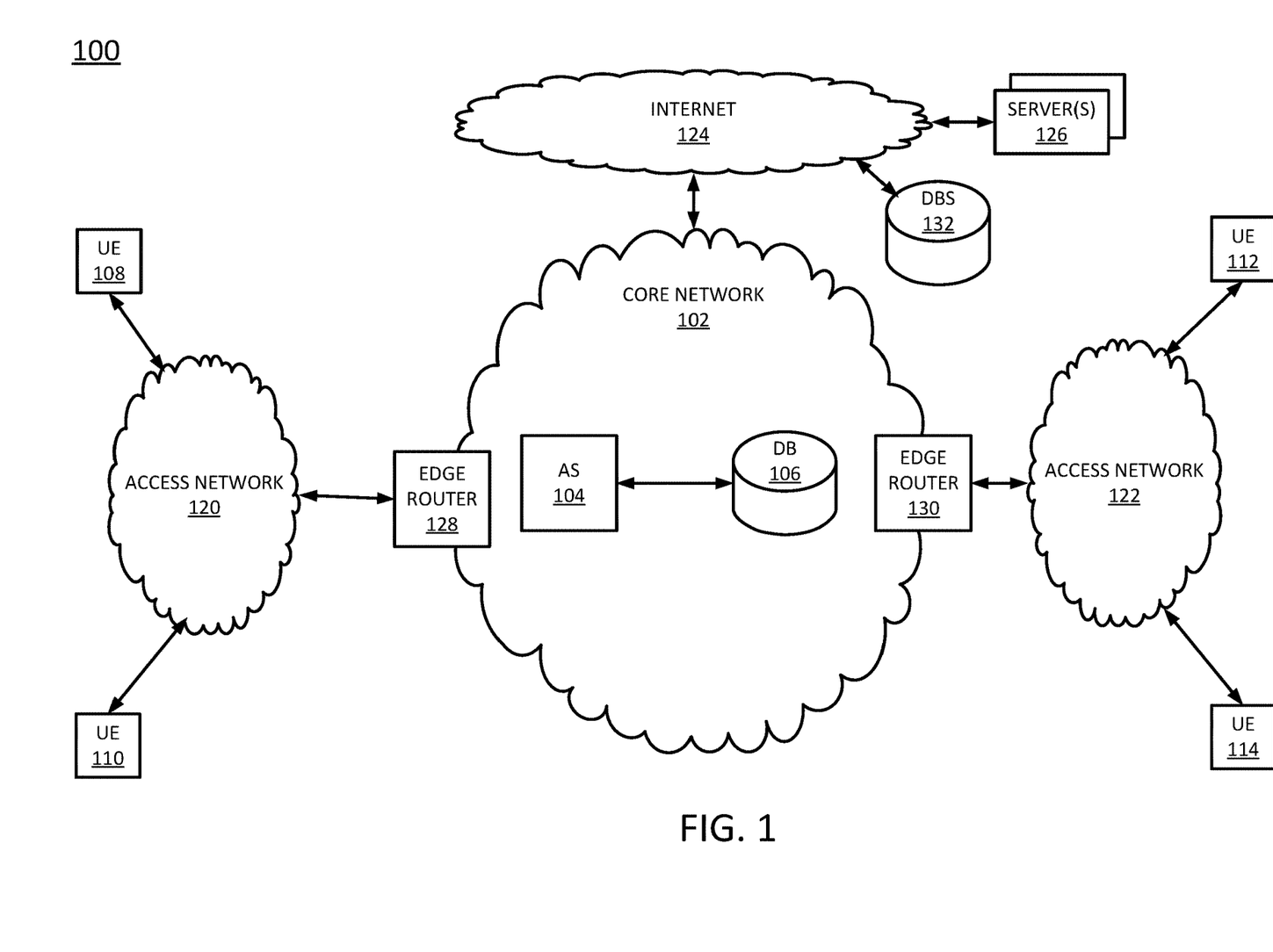
FIG. 1 illustrates an example system in which examples of the present disclosure for the assessment and prioritization of network asset cryptography for quantum risk mitigation may operate.

To further aid in understanding the present disclosure, FIG. 1 illustrates an example system 100 in which examples of the present disclosure for the assessment and prioritization of network asset cryptography for quantum risk mitigation may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, a satellite-based network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a smart phone, a tablet computer, a laptop computer, a gaming device, a wearable smart device (e.g., a smart watch, a fitness tracker, a health monitor, a head mounted display, or the like), an IoT device (e.g., an Internet-enabled thermostat, an Internet-enabled security system, or the like), an autonomous vehicle (e.g., a vehicle that either fully controls its own operation or operates on a reduced level of human input), a global positioning system (GPS) device, a drone, a bank or cluster of such devices, and the like. In one example, any one of the user endpoint devices 108, 110, 112, and 114 may be operable to run applications that provide data to the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange encrypted data with the user endpoint devices 108, 110, 112, and 114 over the Internet 124. Thus, some of the servers 126 and DBs 132 may host applications including video conferencing applications, extended reality (e.g., virtual reality, augmented reality, mixed reality, and the like) applications, immersive gaming applications, and the like. In one example, at least some of the servers 126 and DBs 132 host applications that provide communications services (e.g., voice, data, and other services) to the user endpoint devices 108, 110, 112, and 114.

In accordance with the present disclosure, the AS 104 may be configured to provide one or more operations or functions in connection with examples of the present disclosure for the assessment and prioritization of network asset cryptography for quantum risk mitigation, as described herein. For instance, in one example, the AS 104 may execute a machine learning model that has been trained to take as an input a set of metadata describing an asset of an enterprise (e.g., a software application, a network infrastructure element such as a router, a gateway, a server, a base station or the like, a database, or other information technology infrastructures) and to generate as an output, in response to the set of metadata, a score that quantifies a quantum risk associated with the asset. In one example, the machine learning model may comprise one or more of: a support vector machine, a neural network, a Bayes classifier, a decision tree, and ensemble method, an ensemble tree, a nearest neighbor algorithm, a discriminant analysis model, a generalized additive model, or another type of machine learning model.

The AS 104 may be further configured to rank or sort a plurality of network assets for which scores have been generated using the machine learning model, and to apply a predefined security policy in order to initiate one or more remedial actions to improve the assets' resistance to potential attack by a CRQC. For instance, ranking or sorting the plurality of network assets may help to quickly identify the network assets that are at the greatest risk of compromise from attack by a CRQC or the network assets that, if compromised, would result in the greatest amount of damage to the enterprise, the enterprise's operator, and/or the enterprise's customers.

Security policies may be defined that specify specific actions to be taken in order to protect assets whose scores meet certain thresholds or whose scores fall into certain predefined categories (e.g., low/medium/high risk, or the like). Security policies may also specify deadlines by which the specific actions should be taken (e.g., a date, within a certain period of time after the occurrence of a specified event, etc.).

The timing and nature of with which a remedial action is initiated may also take other factors into consideration. These other factors may include financial considerations (e.g., the costs of implementing a remedial action), consequences of any network downtime that may be necessary while the remedial action is being implemented, and other factors.

Figure 4:
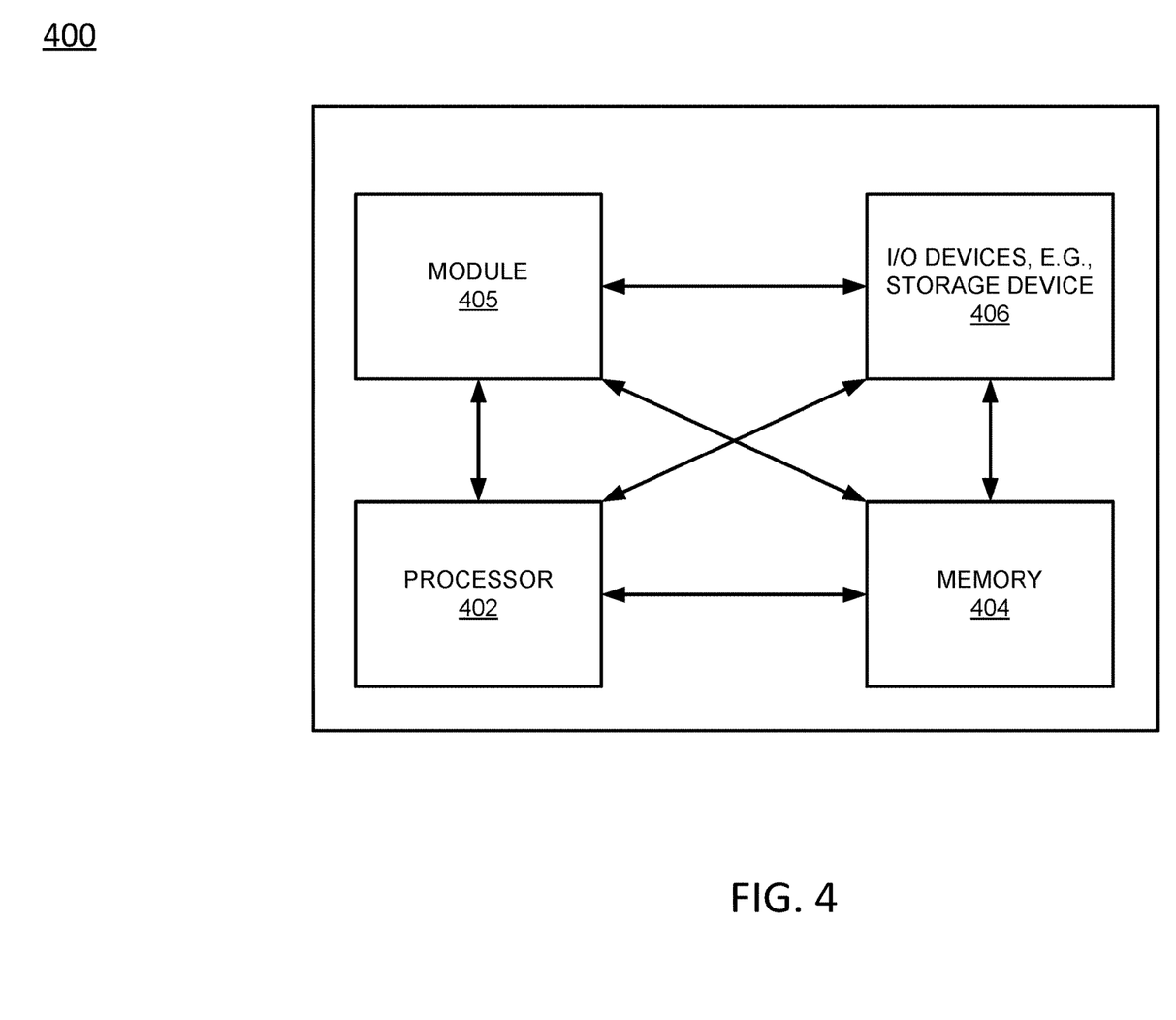
FIG. 4 depicts a high-level block diagram of a computing device specifically programmed to perform the functions described herein.

The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the DB 106 may store information about assets of the system 100, such as software applications, network infrastructure elements (e.g., routers, gateways, servers, base stations, and other nodes), databases, and other information technology infrastructures. For instance, for a software application, the information stored in the database may include metadata such as an emergency tier of the software application (e.g., whether the software application is considered mission critical or non-mission critical by the operator of the enterprise), whether the software application is customer facing (e.g., accessible by customers of the enterprise), whether the software application stores sensitive personal information of customers of the enterprise, whether the software application handles sensitive personal information of customers of the enterprise, whether the software application interfaces with a payment card industry (PCI), whether the software application is accessible from the Internet (e.g., uses Web technology and browsers to perform tasks), a business criticality ranking indicating a level of importance of the software application to the enterprise (e.g., low/medium/high, a numerical scale such as a scale of 1 to 10, etc.), an indictor indicating whether the software application collects customer proprietary network information (CPNI, e.g., services used by customers of the enterprise, as well as amounts and types of usage of the services), the type of the software application's access to the Internet (e.g., comingled, dedicated, shared, or blank/null), an indicator as to whether the software application is related to customer privacy, an indicator as to whether the software application is currently active, an indicator as to whether the software application impacts a competitive local exchange carrier (CLEC), an indicator as to whether the software application handles customer account authentication data, an indicator as to whether the software application handles regulated personal information (RPI), an indicator as to whether the software application handles slowly changing dimension (SCD) data, an indicator as to whether the software application interfaces with or is governed by Sarbanes-Oxley (SOX) regulations or financial statement audits (FSAs), an indicator as to whether the software application contains payment card industry (PCI) data, an indicator as to whether the software application only stores PCI data in non-volatile memory, an indicator as to whether the software application stores other personally identifiable information (PII), an indicator as to whether the software application stores RPI, an indicator as to whether the software application stores SCD data, an indicator as to whether SOX regulations or FSAs are in-scope for the software application, whether the software application utilizes a user interface, and/or any other metadata that may be considered of interest to the machine learning model executed by the AS 104. For instance, the information stored in the database may include any type of data that may be considered sensitive (e.g., personal information, financial information, proprietary information, or information that is considered sensitive for any other reasons). The AS 104 may retrieve the metadata stored in the DB 106 to provide as input to the machine learning model.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for the assessment and prioritization of network asset cryptography for quantum risk mitigation, as described herein. For instance, an example method for the assessment and prioritization of network asset cryptography for quantum risk mitigation is discussed in further detail below in connection with FIGS. 2 and 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
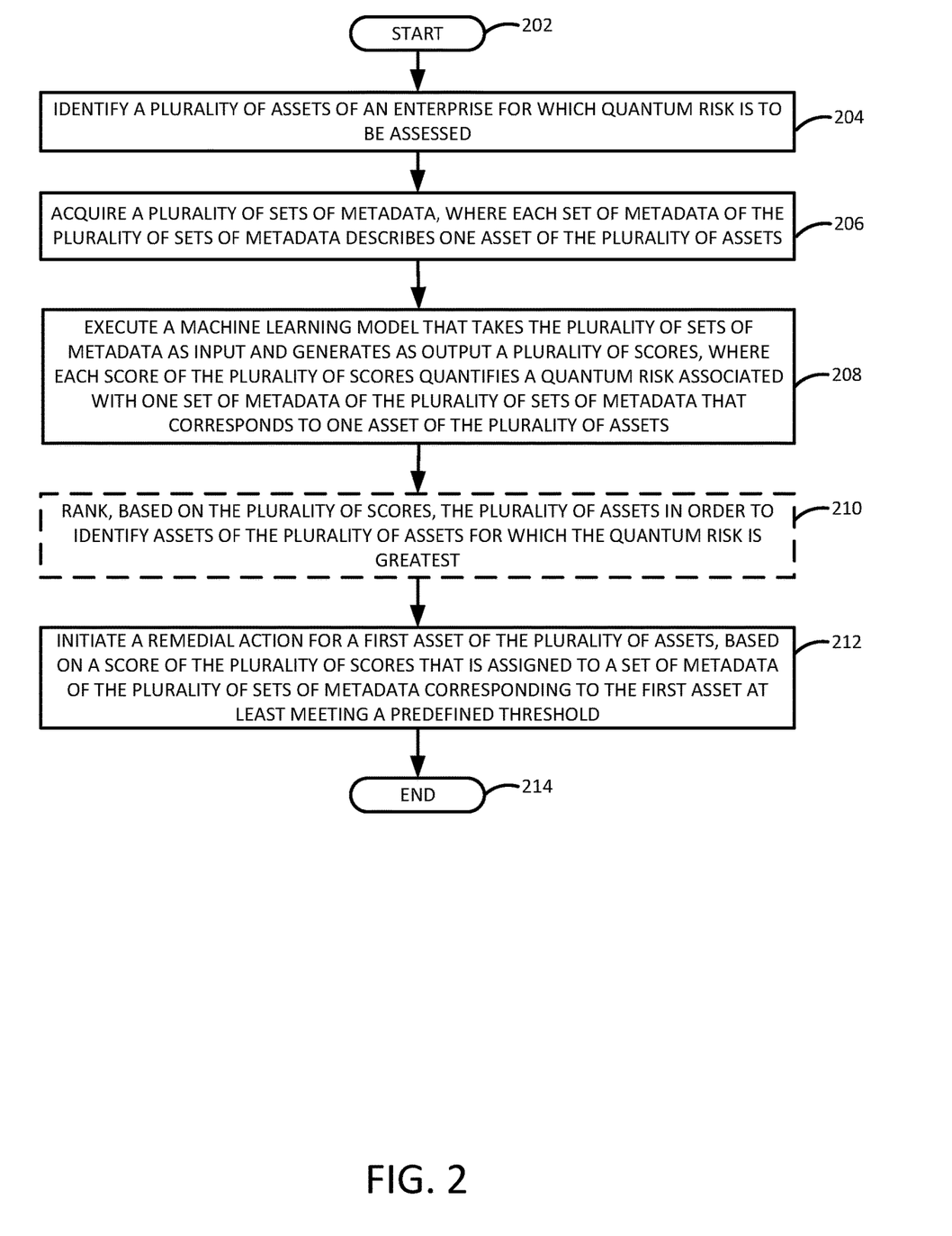
FIG. 2 illustrates a flowchart of an example method for the assessment and prioritization of network asset cryptography for quantum risk mitigation, according to the present disclosure.

To further aid in understanding the present disclosure, FIG. 2 illustrates a flowchart of an example method 200 for the assessment and prioritization of network asset cryptography for quantum risk mitigation. In one example, the method 200 may be performed by the AS 104, one of the edge routers 128 and 130, or by another element of the core network 102 illustrated in FIG. 1. However, in other examples, the method 200 may be performed by another device, such as the computing system 400 of FIG. 4, discussed in further detail below. For the sake of discussion, the method 200 is described below as being performed by a processing system (where the processing system may comprise a component of the AS 104, one of the edge routers 128 and 130, or by another element of the core network 102, the computing system 400, or another device).

The method 200 begins in step 202. In step 204, the processing system may identify a plurality of assets of an enterprise for which quantum risk is to be assessed.

In one example, the enterprise may comprise a communications network, such as a RAN, that is operated by a communications network service provider. In another example, the enterprise may comprise an enterprise network used by an enterprise to provide services, manage enterprise assets, or the like. In one example, the plurality of assets may include software applications, network infrastructure elements (e.g., routers, gateways, servers, base stations, and other nodes), databases, and other information technology infrastructure.

In one example, quantum risk is understood to refer to the risk associated with compromise of an asset by a CRQC. For instance, compromise of some assets may be catastrophic (e.g., resulting in inability to provide a service to large portions of the enterprise, disclosure of private information, such as financial information, medical information, and the like associated with customers of the enterprise, or the like), while compromise of other assets, though undesirable, may be less catastrophic. Moreover, some assets may be more likely to be targeted by attacks than other assets, and some assets may be more resistant to compromise than other assets.

Figure 3:
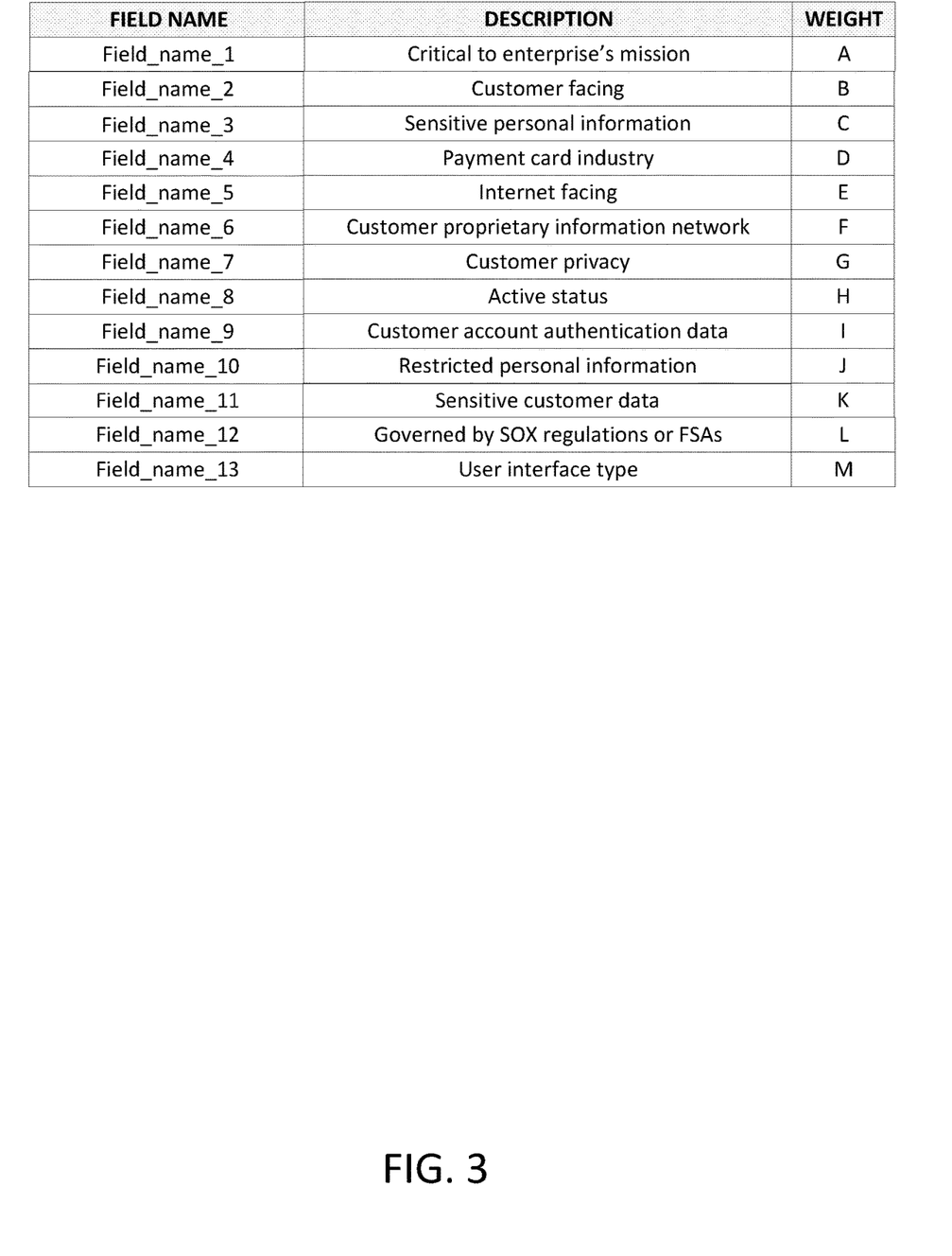
FIG. 3 illustrates a table that lists a plurality of example metadata components for a software application.

In step 206, the processing system may acquire a plurality of sets of metadata, where each set of metadata of the plurality of sets of metadata describes one asset of the plurality of assets. In one example, each set of metadata may include a plurality of metadata components describing different aspects of an asset. FIG. 3, for instance, illustrates a table 300 that lists a plurality of example metadata components for a software application. For instance, for a software application, the plurality of metadata components may include field names identifying at least one of: an emergency tier of the software application (e.g., whether the software application is considered mission critical or non-mission critical by the operator of the enterprise), whether the software application is customer facing (e.g., accessible by customers of the enterprise), whether the software application stores sensitive personal information of customers of the enterprise, whether the software application handles sensitive personal information of customers of the enterprise, whether the software application interfaces with a payment card industry (PCI), whether the software application is accessible from the Internet (e.g., uses Web technology and browsers to perform tasks), a business criticality ranking indicating a level of importance of the software application to the enterprise (e.g., low/medium/high, a numerical scale on a scale of 1 to 10, etc.), an indictor indicating whether the software application collects customer proprietary network information (CPNI, e.g., services used by customers of the enterprise, as well as amounts and types of usage of the services), the type of the software application's access to the Internet (e.g., comingled, dedicated, shared, or blank/null), an indicator as to whether the software application is related to customer privacy, an indicator as to whether the software application is currently active, an indicator as to whether the software application impacts a competitive local exchange carrier (CLEC), an indicator as to whether the software application handles customer account authentication data, an indicator as to whether the software application uses (e.g., handles and/or stores) regulated personal information (RPI), an indicator as to whether the software application handles slowly changing dimension (SCD) data, an indicator as to whether the software application interfaces with or is governed by Sarbanes-Oxley (SOX) regulations or financial statement audits (FSAs), an indicator as to whether the software application contains payment card industry (PCI) data, an indicator as to whether the software application only stores PCI data in non-volatile memory, an indicator as to whether the software application stores other personally identifiable information (PII), an indicator as to whether the software application stores SCD data, an indicator as to whether SOX regulations or FSAs are in-scope for the software application, whether the software application utilizes a user interface, and/or any other metadata that may be considered of interest to the machine learning model executed by the AS 104. For instance, the information stored in the database may include any type of data that may be considered sensitive (e.g., personal information, financial information, proprietary information, or information that is considered sensitive for any other reasons).

Weights assigned to metadata components may be positive or negative and may comprise whole integers or fractional values. In FIG. 3, the various variables represent different generalized weights.

In step 208, the processing system may execute a machine learning model that takes the plurality of sets of metadata as input and generates as output a plurality of scores, where each score of the plurality of scores quantifies a quantum risk associated with one set of metadata of the plurality of sets of metadata that corresponds to one asset of the plurality of assets.

In one example, the machine learning model may comprise one or more of: a support vector machine, a neural network, a Bayes classifier, a decision tree, and ensemble method, an ensemble tree, a nearest neighbor algorithm, a discriminant analysis model, a generalized additive model, or another type of machine learning model.

In one example, the machine learning model may generate, for each metadata component in a set of metadata, an individual score that indicates a quantum risk associated with the metadata component. The individual scores for all metadata components in a set of metadata may then be aggregated in order to generate an overall score for the set of metadata. In one example, aggregating the individual scores may involve assigning different weights to each of the metadata components, and then taking the weighted sum of all of the metadata components. For instance, the individual score for a given metadata component may be computed by multiplying a value of the given metadata component by the weight assigned to the given metadata component. In this case, at least two metadata components in the same set of metadata may be assigned different weights. In one example, the weights may be configurable so that the operator of the enterprise can define which metadata components they consider to be most important in assessing the risk of an asset. Referring again to FIG. 3, the table 300 shows some example weights (represented by variables A-M) that may be assigned to different metadata components that describe a software application.

In one example, the value (e.g., unweighted individual score, or value prior to being multiplied by a weight) of at least some of the metadata components is binary. For instance, if the metadata component is an indicator for which an answer is yes or no (e.g., whether a software application is mission critical, whether a software application stores SPI data, or handles customer account authentication data), then the value for the metadata component may be zero or one (e.g., zero if the answer is no, one if the answer is yes). For metadata components for which the possible answers may fall within a non-binary range (e.g., business criticality), the value may vary along the non-binary range (e.g., one for low business criticality, five for medium business criticality, ten for high business criticality). As discussed above, the value may be multiplied by a weight corresponding to the metadata component to produce an individual score for the metadata component, and then aggregated with similarly computed individual scores for other metadata components describing the same asset.

In optional step 210 (illustrated in phantom), the processing system may rank, based on the plurality of scores, the plurality of assets in order to identify assets of the plurality of assets for which the quantum risk is greatest.

In one example, the plurality of scores may be ranked from highest score to lowest score, so that the assets for which compromise by a CRQC would be most damaging are ranked more highly than the assets for which compromise by a CRQC would be less damaging. However, in other examples, the plurality of scores may be ranked from lowest score to highest score. Thus, the ranking allows an operator of the enterprise to quickly prioritize, at an enterprise level, assets for protection against compromise by a CRQC (e.g., assets for which the risk or damage would be greatest may be prioritized over assets for which the risk or damage would be less great). A prioritized, risk-centered list of assets enables the operator of the enterprise to make efficient and intelligent decisions about cryptographic migration strategy.

In one example, a plurality of thresholds may be used to categorize the plurality of assets into groups. For instance, in one example, any assets of the plurality of assets that are associated with scores that fall below a first threshold may be grouped into a first group that is associated with a first risk level (e.g., low risk). Any assets of the plurality of assets that are associated with scores that are above the first threshold, but below a second threshold, may be grouped into a second group that is associated with a second risk level (e.g., medium risk). Any assets of the plurality of assets that are associated with scores that are above the second threshold may be grouped into a third group that is associated with a third risk level (e.g., high risk). In one example, the first and second thresholds may be configurable so that the operator of the enterprise may define acceptable levels of risk for their operations. In other examples, more or fewer groups or risk level categories may be defined using more or fewer thresholds to set the boundaries between groups. Additionally, the thresholds may be configured in order to group the plurality of assets in a manner that helps to identify the assets that are most critical to the operations of the operation of the enterprise (e.g., assets that, if compromised, would create the greatest disruption to operations).

In one example, each group of assets defined according to a set of thresholds as described above may be associated with a different security policy. The security policy may define a set of remedial actions to be taken for any assets that are categorized into the group. The set of remedial actions may be designed to make the assets that are categorized into the group more quantum-resistant (i.e., more resistant to a potential attack by a CRQC). In a further example, the security policy may define a set of deadlines (e.g., dates) by which the set of remedial actions is to be implemented.

In one example, a remedial action associated with a security policy may include any one or more of the following: development and implementation of an encryption algorithm that is resistant to attacks from both classical and quantum computers (e.g., post-quantum cryptography), quantum key distribution leveraging the principles of quantum mechanics to securely exchange encryption keys between parties (e.g., using quantum-secure communication channels to minimize the risk of eavesdropping or key interception), segmenting sensitive data into multiple smaller, isolated data units in order to minimize the exposure of critical information to successful decryption attempts, investment in advanced threat intelligence and monitoring solutions to help proactively identify and respond to emerging quantum threats (e.g., including continuous monitoring and analysis of the threat landscape), employee training to help employees better identify, report, and respond to potential quantum-related attacks and to promote a security-conscious employee culture, implementation of a cryptographically agile architecture (e.g., an architecture that allows for the changing of encryption algorithms on short notice, without significant impact to business operations) in the enterprise, collection of a detailed cryptographic bill of materials (CBOM) in a centralized inventory to provide insights and intelligence for remediating quantum threats, implementing enhanced cryptography requirements for applications that host application programming interface (API) calls, and requiring deployment of quantum-resistant versions of APIs.

In step 212, the processing system may initiate a remedial action for a first asset of the plurality of assets, based on a score of the plurality of scores that is assigned to a set of metadata of the plurality of sets of metadata corresponding to the first asset at least meeting a predefined threshold.

In one example, the remedial action may comprise the implementation of a quantum-resistant, crypto-agile architecture. Thus, the remedial action may make the first asset more resistant to a potential attack by a CRQC.

In one example, as discussed above, the remedial action may be implemented in accordance with a security policy that is associated with a group into which the first asset has been categorized. In one example, the remedial action is one of a plurality of remedial actions defined by the security policy. In a further example, the remedial action may be initiated on or before a deadline for the remedial action that is specified in the security policy.

In one example, a determination as to when to initiate the remedial action may be based at least in part on other financial, quantified risk, and/or mitigation cost data, as well as on any deadlines defined in the security policy. For instance, the implementation of post-quantum security solutions such as quantum key distribution tend to be costly, since they require the deployment of new network hardware across a communications network. On the other hand, implementation of quantum-resistant, crypto-agile architecture is relatively less costly and may be deployed more feasibly. In some examples, remedial actions may be staggered for all of the assets within a common group associated with a given security policy. The method 200 may end in step 214.

Thus, the method 200 utilizes machine learning techniques to examine a set of input metadata associated with a network asset such as a software application and to generate, based on the set of input metadata, a score that indicates the quantum risk associated with (i.e., expected impact of a CRQC on) the network asset. Once scores have been generated for a plurality of network assets, the scores can be used to rank the network assets according to quantum risk, allowing a network operator to easily and efficiently identify the network assets that should be prioritized for protective measures.

Although not expressly specified above, one or more steps of the method 200 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the methods 200 may be implemented as the system 400. For instance, any one or more of the servers 104 or 126 or edge routers 128 or 130 of FIG. 1 (such as might be used to perform the method 200) could be implemented as illustrated in FIG. 4.

As depicted in FIG. 4, the system 400 comprises a hardware processor element 402, a memory 404, a module 405 for the assessment and prioritization of network asset cryptography for quantum risk mitigation, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for the assessment and prioritization of network asset cryptography for quantum risk mitigation may include circuitry and/or logic for performing special purpose functions relating to estimating usage of a wireless network by a user device and/or determining periods of time (e.g., numbers of symbols) for which to mute transmit and/or receive capabilities of the user device to conserve energy. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method (s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for the assessment and prioritization of network asset cryptography for quantum risk mitigation can be loaded into memory 404 and executed by hardware processor element 402 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for the assessment and prioritization of network asset cryptography for quantum risk mitigation (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   identifying, by a processing system including at least one processor, a plurality of assets of an enterprise for which a quantum risk is to be assessed;
   acquiring, by the processing system, a plurality of sets of metadata, where each set of metadata of the plurality of sets of metadata describes one asset of the plurality of assets;
   executing, by the processing system, a machine learning model that takes the plurality of sets of metadata as an input and generates as an output a plurality of scores, where each score of the plurality of scores quantifies a quantum risk associated with one set of metadata of the plurality of sets of metadata that corresponds to one asset of the plurality of assets;
   ranking, by the processing system based on the plurality of scores, the plurality of assets in order to identify assets of the plurality of assets for which the quantum risk is greatest, wherein the ranking comprises:
     grouping assets of the plurality of assets that are associated with scores of the plurality of scores that fall below a first threshold into a first group that is associated with a first risk level;
     grouping assets of the plurality of assets that are associated with scores of the plurality of scores that are above the first threshold, but fall below a second threshold, into a second group that is associated with a second risk level; and
     grouping assets of the plurality of assets that are associated with scores of the plurality of scores that are above the second threshold into a third group that is associated with a third risk level; and
   initiating, by the processing system, a remedial action for a first asset of the plurality of assets, based on a first score of the plurality of scores that is assigned to a first set of metadata of the plurality of sets of metadata corresponding to the first asset at least meeting a predefined threshold, wherein the remedial action comprises implementing an architecture for the first asset that improves a resistance of the first asset to attack by a cryptographically relevant quantum computer.

2. The method of claim 1, wherein the quantum risk comprises a risk associated with a compromise of an asset of the plurality of assets by the cryptographically relevant quantum computer.

3. The method of claim 1, wherein the plurality of assets includes at least one of: a software application, a network infrastructure element, a database, or an element of information technology infrastructure.

4. The method of claim 3, wherein the first asset of the plurality of assets comprises the software application, and the first set of metadata of the plurality of sets of metadata that describes the software application includes at least one of a plurality of metadata components: an emergency tier of the software application, whether the software application is customer facing, whether the software application stores sensitive personal information of customers of an enterprise, whether the software application handles sensitive personal information of the customers of the enterprise, whether the software application interfaces with a payment card industry, whether the software application is accessible from an internet, a business criticality ranking indicating a level of importance of the software application to the enterprise, an indictor indicating whether the software application collects customer proprietary network information, a type of access to the internet of the software application, an indicator as to whether the software application is related to customer privacy, an indicator as to whether the software application is currently active, an indicator as to whether the software application impacts a competitive local exchange carrier, an indicator as to whether the software application handles customer account authentication data, an indicator as to whether the software application uses regulated personal information, an indicator as to whether the software application handles slowly changing dimension data, an indicator as to whether the software application is governed by sarbanes-oxley regulations or financial statement audits, an indicator as to whether the software application contains payment card industry data, an indicator as to whether the software application only stores payment card industry data in a non-volatile memory, an indicator as to whether the software application stores other personally identifiable information, an indicator as to whether the software application stores slowly changing dimension data, an indicator as to whether the sarbanes-oxley regulations or the financial statement audits are in-scope for the software application, or whether the software application utilizes a user interface.

5. The method of claim 4, wherein the emergency tier indicates whether the software application is considered mission critical or non-mission critical by an operator of the enterprise.

6. The method of claim 4, wherein the business criticality ranking comprises a ranking on a scale that includes: low, medium, and high.

7. The method of claim 4, wherein the business criticality ranking is ranked on a numerical scale.

8. The method of claim 4, wherein the customer proprietary network information includes at least one of: services used by the customers of the enterprise, amounts of usage of the services used by the customers of the enterprise, or types of usage of the services by the customers of the enterprise.

9. The method of claim 4, wherein the type of access to the internet of the software application is at least one of: comingled, dedicated, shared, or blank.

10. The method of claim 1, wherein the executing comprises:
    generating, by the processing system for each set of metadata of the plurality of sets of metadata, an individual score for each metadata component in the each set of metadata that indicates a quantum risk associated with the each metadata component; and
    aggregating, by the processing system, the individual score for the each metadata component with individuals scores generated for all other metadata components in the each set of metadata to produce a score of the plurality of scores that is assigned to the each set of metadata.

11. The method of claim 10, wherein the generating the individual score comprises:
assigning, to each metadata component of the each set of metadata, a weight, wherein at least two metadata components in the each set of metadata are assigned different weights; and
multiplying a value of the each metadata component by the weight assigned to the each metadata component to generate the individual score.

12. The method of claim 11, wherein the weights are configurable by an operator of the enterprise.

13. The method of claim 1, wherein the architecture comprises implementing a quantum-resistant, crypto-agile architecture for the first asset.

14. The method of claim 1, wherein the initiating comprises implementing at least one of: an encryption algorithm that is resistant to attacks from both classical and quantum computers, quantum key distribution leveraging principles of quantum mechanics to securely exchange encryption keys between parties, or segmenting sensitive data into multiple smaller, isolated data units in order to minimize an exposure of critical information to successful decryption attempts.

15. The method of claim 1, wherein the initiating comprises implementing at least one of: implementing threat intelligence and monitoring solutions to help proactively identify and respond to emerging quantum threats, collecting of a cryptographic bill of materials in a centralized inventory to provide insights and intelligence for remediating quantum threats, implementing enhanced cryptography requirements for applications that host application programming interface calls, or deploying of quantum-resistant versions of application programming interfaces.

16. The method of claim 1, wherein the first and second thresholds are configurable by an operator of the enterprise.

17. The method of claim 1, wherein each of: the first group, the second group, and the third group is associated with a different security policy of a plurality of security policies, and wherein each security policy of the plurality of security policies defines at least one remedial action to be taken for any assets of the plurality of assets that are grouped in the first group, the second group, or the third group.

18. The method of claim 17, wherein the each security policy further defines a deadline by which each remedial action of the at least one remedial action is to be taken.

19. A non-transitory computer-readable medium storing instructions which, when executed by a processing system including at least one processor, cause the processing system to perform operations, the operations comprising:
identifying a plurality of assets of an enterprise for which a quantum risk is to be assessed;
acquiring a plurality of sets of metadata, where each set of metadata of the plurality of sets of metadata describes one asset of the plurality of assets;
executing a machine learning model that takes the plurality of sets of metadata as an input and generates as an output a plurality of scores, where each score of the plurality of scores quantifies a quantum risk associated with one set of metadata of the plurality of sets of metadata that corresponds to one asset of the plurality of assets;
ranking, based on the plurality of scores, the plurality of assets in order to identify assets of the plurality of assets for which the quantum risk is greatest, wherein the ranking comprises:
grouping assets of the plurality of assets that are associated with scores of the plurality of scores that fall below a first threshold into a first group that is associated with a first risk level;
grouping assets of the plurality of assets that are associated with scores of the plurality of scores that are above the first threshold, but fall below a second threshold, into a second group that is associated with a second risk level; and
grouping assets of the plurality of assets that are associated with scores of the plurality of scores that are above the second threshold into a third group that is associated with a third risk level; and
initiating a remedial action for a first asset of the plurality of assets, based on a first score of the plurality of scores that is assigned to a first set of metadata of the plurality of sets of metadata corresponding to the first asset at least meeting a predefined threshold, wherein the remedial action comprises implementing an architecture for the first asset that improves a resistance of the first asset to attack by a cryptographically relevant quantum computer.

20. A system comprising:
a processing system including at least one processor; and
a non-transitory computer-readable medium storing instructions which, when executed by the processing system, cause the processing system to perform operations, the operations comprising:
identifying a plurality of assets of an enterprise for which a quantum risk is to be assessed;
acquiring a plurality of sets of metadata, where each set of metadata of the plurality of sets of metadata describes one asset of the plurality of assets;
executing a machine learning model that takes the plurality of sets of metadata as an input and generates as an output a plurality of scores, where each score of the plurality of scores quantifies a quantum risk associated with one set of metadata of the plurality of sets of metadata that corresponds to one asset of the plurality of assets;
ranking, based on the plurality of scores, the plurality of assets in order to identify assets of the plurality of assets for which the quantum risk is greatest, wherein the ranking comprises:
grouping assets of the plurality of assets that are associated with scores of the plurality of scores that fall below a first threshold into a first group that is associated with a first risk level;
grouping assets of the plurality of assets that are associated with scores of the plurality of scores that are above the first threshold, but fall below a second threshold, into a second group that is associated with a second risk level; and
grouping assets of the plurality of assets that are associated with scores of the plurality of scores that are above the second threshold into a third group that is associated with a third risk level; and
initiating a remedial action for a first asset of the plurality of assets, based on a first score of the plurality of scores that is assigned to a first set of metadata of the plurality of sets of metadata corresponding to the first asset at least meeting a predefined threshold, wherein the remedial action comprises implementing an architecture for the first asset that improves a resistance of the first asset to attack by a cryptographically relevant quantum computer.

\* \* \* \* \*